United States Patent [19]
Armstrong

[11] 3,882,306
[45] May 6, 1975

[54] OSCILLATING LIGHT APPARATUS

[76] Inventor: J. Delvin Armstrong, 2224 137th Pl. SE, Bellevue, Wash. 98005

[22] Filed: Aug. 31, 1973

[21] Appl. No.: 393,618

[52] U.S. Cl. .............................. 240/48; 240/78 R
[51] Int. Cl. ............................................ F21m 7/00
[58] Field of Search ........... 240/49, 52 R, 61, 61.11, 240/61.5, 62, 61.05, 78, 48

[56] References Cited
UNITED STATES PATENTS

| | | | |
|---|---|---|---|
| 1,691,011 | 11/1928 | Jackson | 240/49 |
| 2,074,404 | 3/1937 | Kolb | 240/61.05 |
| 2,136,429 | 11/1938 | Forsyth | 240/49 X |
| 2,344,153 | 3/1944 | Leonard | 240/49 X |
| 2,905,806 | 9/1959 | Tunney | 240/78 R X |
| 2,911,518 | 11/1959 | Anderson | 240/78 R |
| 2,911,519 | 11/1959 | Phillips et al. | 240/78 R X |
| 3,016,791 | 1/1962 | Inwagen | 240/61 X |
| 3,309,661 | 3/1967 | Kennelly | 240/49 X |
| 3,718,816 | 2/1973 | Seelbach | 240/52 R |

*Primary Examiner*—Samuel S. Matthews
*Assistant Examiner*—Alan Mathews
*Attorney, Agent, or Firm*—Christensen, O'Connor, Garrison & Havelka

[57] ABSTRACT

An apparatus for controlling a light beam from a conventional high intensity light fixture in such a manner that illumination from the light fixture follows a predetermined, periodic oscillation path, to aid in the growth of illuminated plants. The light fixture is secured in a mounting structure which in turn is pivotally connected to a fixed support brace. A low rpm motor drives the mounting structure by means of a series of connected levers such that the mounting structure pivots about a given axis through a predetermined angle, resulting in the light beam oscillating through a predetermined angle in a specified period.

11 Claims, 5 Drawing Figures

PATENTED MAY 6 1975

OSCILLATING LIGHT APPARATUS

BACKGROUND OF THE INVENTION

This invention relates generally to the lighting art, and more specifically to the art of greenhouse lighting.

Artificial light is currently being used in greenhouses on a small scale to promote plant growth. It has been previously discovered that the rate of plant growth and production is a direct function of the quantity, intensity and spectral energy distribution of the light radiation impinging on the plant. Although the precise relationship between the quantity of light, intensity of light, spectral energy distribution, and resulting plant growth has not been accurately defined, it has been established that a substantial number of plants mature and produce faster as the quantity and intensity of light at certain wavelengths on the plant increases.

Accordingly, commercial greenhouses have experimented with artificial lighting systems to some degree. Light of proper wavelength for stimulation of plant growth is supplied to plants on a continuous basis, and the growth cycle is thus no longer dependent on natural sunlight. Several methods for artificially lighting a greenhouse have been developed. One such method is referred to as photoperiodism, in which the plants are subjected to predetermined alternating periods of light and darkness. Experimentation in this area has been directed toward developing an optimum light-nonlight relationship for the growth cycle of a particular plant. A second important method is referred to as high intensity light supplemental illumination. This method uses high intensity light having a wavelength and an energy level which produce accelerated growth in plants. Although the high intensity illumination method has achieved significant results in accelerating plant growth, it has not been heretofore economical to install such a system in commercial greenhouses, as a significant number of individual high intensity light fixtures are required to properly illuminate an entire greenhouse. Typically, one such fixture is required for every 16 square feet of greenhouse growing space, and heretofore the costs of purchasing, operating and maintaining such a lighting system have more than offset the resultant increased production. Thus, there is a substantial need, in view of the increasing commercial use of greenhouses, for an economical greenhouse lighting system utilizing conventional high intensity light sources for promotion of plant growth.

In view of the above, it is a general object of the present invention to overcome the disadvantages of the prior art.

It is another object of the present invention to provide a greenhouse lighting apparatus which, when installed as a system, is significantly less expensive than prior art high intensity greenhouse lighting systems.

It is another object of the present invention to provide a greenhouse lighting apparatus utilizing high intensity light sources wherein the light energy level is substantially uniform over the surface affected by the light source over a given time.

It is a further object of the present invention to provide a greenhouse lighting apparatus wherein the generated light beam oscillates through a given arc in a predetermined time.

It is yet another object of the present invention to provide an oscillating lighting apparatus capable of providing substantially uniform light energy over a specified area for a given period of time.

SUMMARY OF THE INVENTION

Accordingly, the present invention includes a lamp which emits light radiation, means associated with the lamp which controls the direction of the light radiation emitted by the lamp, and means for moving the control means in a predetermined manner, such that the illumination from the lamp cyclically follows a given path and completes a cycle in a given period of time. The control means is moved by the moving means in such a manner that all portions of the given path receive equal illumination over said given period of time.

DESCRIPTION OF THE PREFERRED EMBODIMENT

Figure 2:
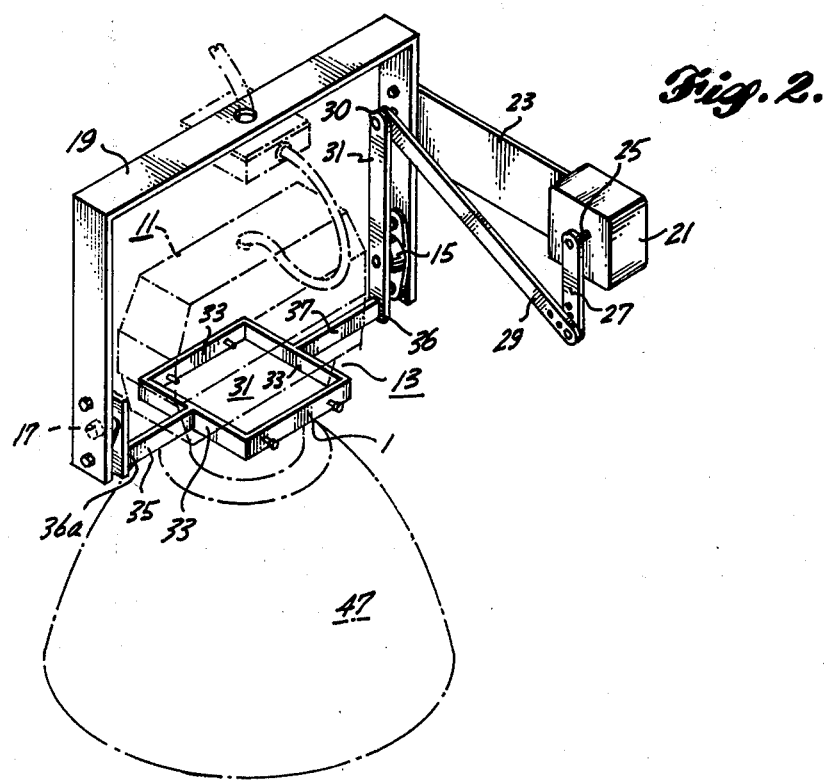
FIG. 2 is an isometric view of the present invention, showing the positioning of the light fixture therein.

Referring generally to FIG. 2, the apparatus of the present invention is shown, in which a conventional high intensity light source, such as a high pressure sodium, mercury vapor or electrodeless arc light fixture 11 is secured to a mounting structure 13, which in turn is pivotable about points 15 and 17. A three-sided support brace 19 to which the mounting structure 13 is pivotally connected is rigidly secured by conventional means to a building frame or like structure, such as a rigid beam in a greenhouse. Power to energize the high intensity lamp 11 is supplied by conventional means. A low rpm motor 21 is secured to the support brace 19 by brace 23, while the rotating output shaft 25 of the motor 21 is connected to the mounting structure 13 through lever arms 27 and 29 and upright 31. As shaft 25 slowly rotates, lever arm 27 also rotates, which lever arm in turn forces the upper end 30 of upright 31 to be driven generally back and forth by means of lever arm 29. Mounting structure 13, and hence light fixture 11 thus are forced to pivot about an axis through pivot points 15 and 17.

The pivoting of light fixture 11 results in the directed beam of light therefrom oscillating through a predetermined arc. The light from fixture 11 will impinge on a given plane surface area beneath the fixture in a time-varying manner. The speed and arc length of the moving fixture, as well as other physical variables, may be varied to provide a uniform distribution of light energy on the given plane surface with respect to a given period of time. By providing such a uniform distribution of light energy over a given area, it has been found that the number of fixed fixtures to accomplish the same results can be substantially reduced, thereby significantly reducing the cost of such a system. This will become clearer as a detailed description of the invention proceeds in the following paragraphs.

Figure 4:
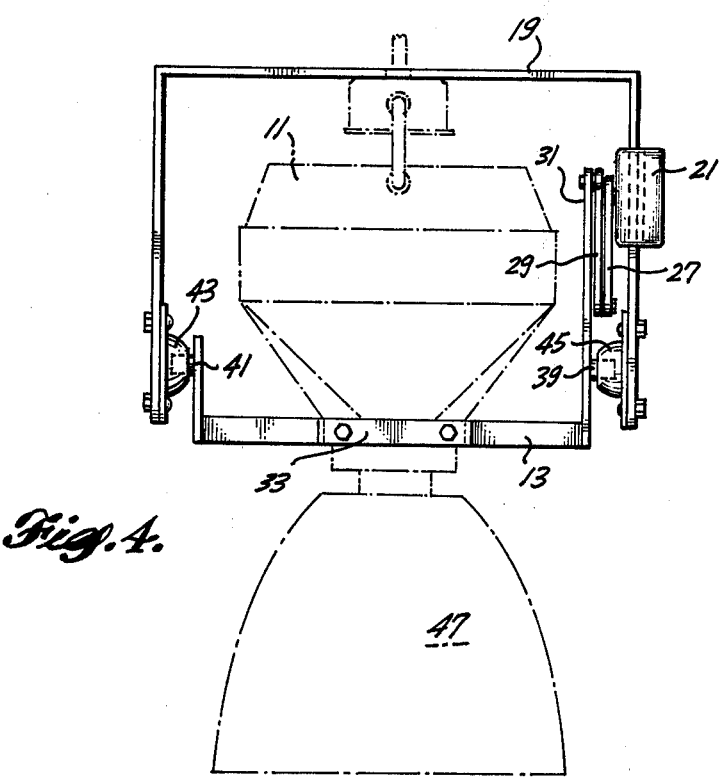
FIG. 4 is a front view of the present invention showing the light fixture in place.

The mounting structure 13, shown most clearly in FIG. 2, includes a cradle section 31, comprising four rectangular bar members 33—33 joined at each end to form an enclosed square, and further includes two additional bar members 35 and 37 extending away from the approximate midpoint of two opposite sides of the cradle section 31. Ends 36 and 36a of members 35 and 37 are secured to uprights 31 and 32, which in turn each have a protrusion 39, 41 (FIG. 4) extending therefrom, which mate, respectively, with pivot sockets 43 and 45 (FIG. 4) which are secured to two opposing sides of the support brace 19. Mounting structure 13 is then free to pivot about an imaginary axis through pivot points 15 and 17, which comprise protrusions 39 and 41 and mating pivot sockets 43 and 45.

Conventional light fixtures, such as the high pressure sodium fixture shown in the drawing, may then be positioned in the cradle section 31 and secured by conventional means. In a greenhouse lighting system, the light fixture typically uses either mercury vapor, metal halide, or high pressure sodium vapor lamps, with an associated ballast circuit, which provides the proper starting and operating voltage for the lamp, and which limits current through the lamp. Special lamps emitting controlled wavelength radiation may also be used. Plants particularly respond to wavelengths of light in the violet and red spectrums, and to a lesser extent to wavelength spectrums in between. Although lamps of varying wattage may be conveniently utilized with the present invention, 400 watt, high pressure sodium vapor lamps are currently being used successfully. A conventional reflector shield 47 is placed around the high intensity lamp to provide necessary illumination directivity. It is, of course, well within the skill of the art to adapt the structure of the present invention so as to accommodate different high intensity lamp fixtures, such as electrodeless arc discharge lamps as well as other lighting fixtures in general. The light fixture is energized by the means of available 120 volt line voltage, or by means of other conventional self-contained energy sources. The support brace 19, which forms a rectangle with one side open, is made from rigid, high strength material, and is adapted so that it may be secured to fixed beams or other building supports.

Figure 3:
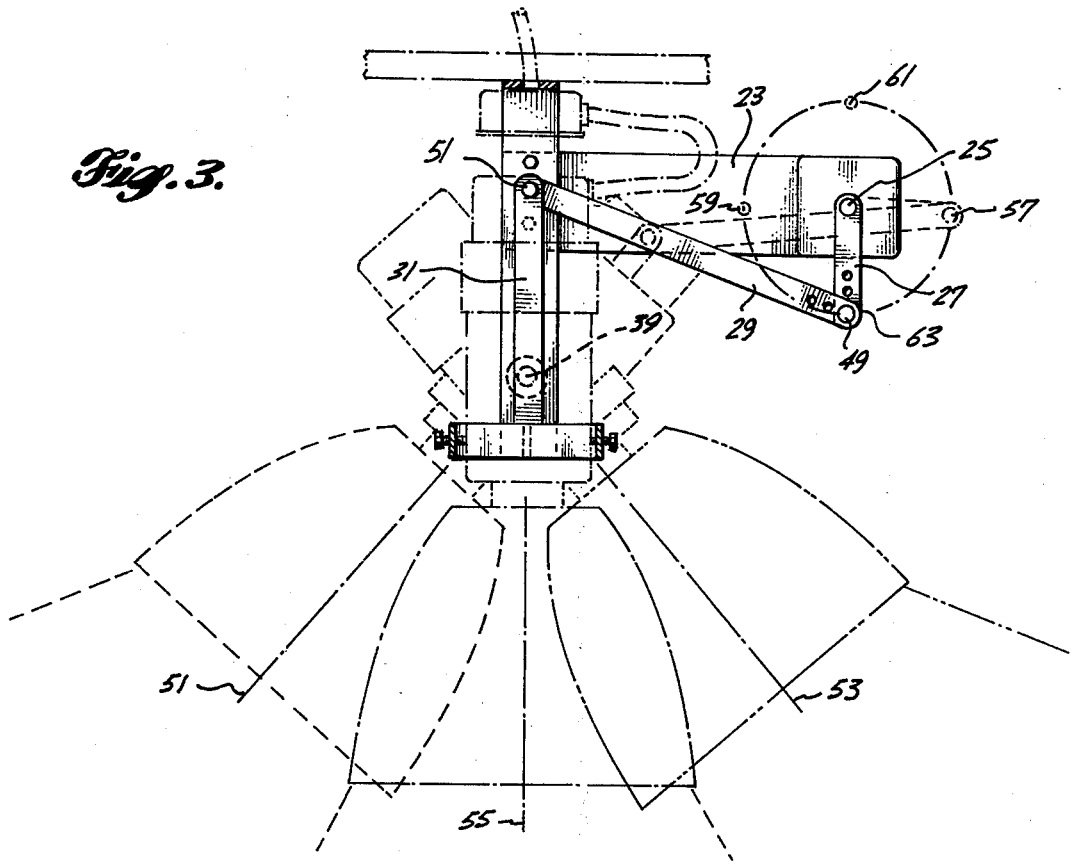
FIG. 3 is an elevation view of the present invention showing predetermined oscillation limits for the light fixture.

A conventional low rpm motor 21, adjusted for an output shaft rotation of 1 rpm, is fixedly positioned adjacent the support brace 19 by means of brace 23. Referring to FIG. 3, lever arm 27, one end of which is secured to the output shaft 25, rotates as the output shaft rotates. In rotation, the other end of lever 27 defines a circle having a radius substantially equal to the length of lever 27, which circle is coplanar with the direction of pivot of the mounting structure 13. The other end of lever 27 is rotatably connected to one end of lever arm 29 about pin 49. The one end of lever arm 29 thus also defines a circle in response to the rotation of output shaft 25. The other end of lever arm 29 is rotatably secured about pin 51 to the upper end 30 of upright 31 such that the other end of lever arm 29, and hence the upper end 30 of upright 31 describe an arcuate path centered about pivot point 15 in response to the rotation of output shaft 25.

The mounting structure 13, including uprights 31 and 32 thus pivot about points 15 and 17, in response to the rotation of shaft 25. Cradle section 31 accordingly pivots through a specified arc, the length of which is dependent on the relative lengths of upright 31 and levers 27 and 29. Note that the rotatably co-connected ends of lever arms 27 and 29 each have a plurality of holes located therein, such that the length of the arc, and hence the period of oscillation, may be varied by changing the hole location of the pin 49, thereby shortening the length of one or both of the lever arms.

Since the light fixture 11 is secured to the cradle section 31, the light fixture itself will follow a similar arc to that followed by the cradle and the mounting structure 13 when the motor 21 is operating. FIG. 3 illustrates the two extreme positions and midpoint position of the lamp as it oscillates through a given arc.

Figure 5:
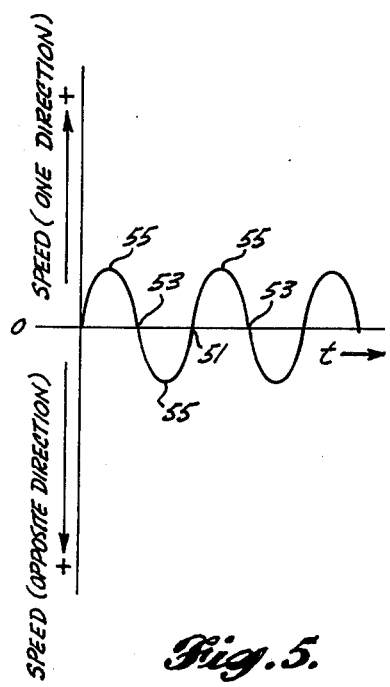
FIG. 5 is a graph of fixture speed vs. time during oscillation.

As expected from such a driving arrangement for the light fixture, the speed of the light fixture will vary in time in a manner similar to that of a standard sine wave, as shown in FIG. 5. After the fixture 11 comes to rest briefly at one extreme 51 (FIG. 3) of its arcuate path, and begins to move toward the opposite extreme point 53, its speed increases until it reaches a maximum at the path midpoint 55. As it proceeds toward the opposite extreme, it gradually slows down until again it is briefly at rest at point 53, before proceeding in the opposite direction in the same manner. Referring to FIG. 3, this varying speed is caused by the fact that the lateral travel of the one end of lever arm 29 connected to lever arm 27 and hence also the other end of lever arm 29 varies with time. At points 57 and 59 in the circular path defined by the co-connected ends of lever arms 27 and 29, lateral travel is zero, and hence, the speed of the light fixture will also be zero. At points 61 and 63, the lateral movement with respect to time is maximum, and therefore the speed of the fixture is at a maximum. The speed of the fixture at the various path positions is shown in FIG. 5.

However, the intensity of the light from the lamp impinging on a plane surface beneath the fixture is at a maximum at midpoint position 55 (the lamp is closest to the plane surface) while at the extremes 51 and 53 of the fixture movement, where the fixture is stopped momentarily, the intensity of the light on the surface is at a minimum (the lamp is at its greatest angle with respect to the surface). By adjusting the period of the oscillation, the distributed light energy over a given plane surface area beneath the oscillating light fixture may be maintained quite uniform with respect to a given quantity of time. The oscillation period will depend upon a number of factors, including the coverage desired, the degree of uniformity of energy distribution desired, the distance separating the fixture from the plane surface and the nominal light rating of the lamp. It has been determined by the inventor that for a lamp arc of 90°, (90° between Lines 51 and 53 in FIG. 3), given a 400 watt high pressure sodium lamp located 5–6 feet above the plane surface on which the plants are located, an oscillation period of one minute produces a significant increase in plant growth.

Figure 1:
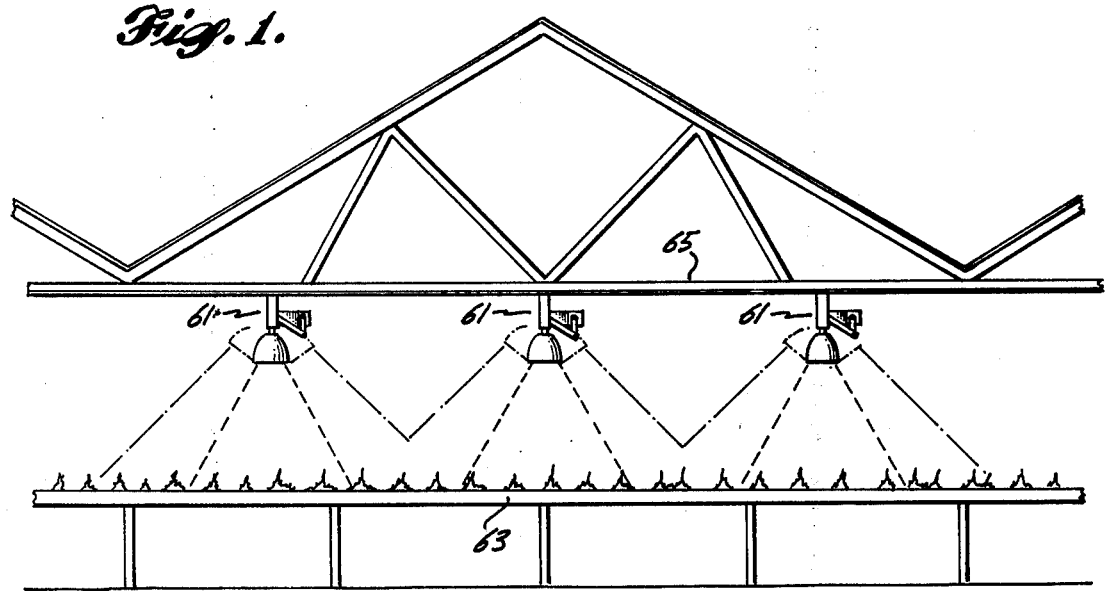
FIG. 1 is a diagram of the present invention in a greenhouse lighting system.

Referring to FIG. 1, which shows a portion of a system utilizing the present invention in a greenhouse environment, the light apparatuses 61—61 are placed approximately 6 feet above the plane surface 63 containing the growing plants. The support brace of each lighting apparatus is secured to a building brace 65 of the greenhouse. By describing an arc of 90° in its oscillation, and utilizing an oscillation period of approximately 1 minute with 400 watt high intensity lamps, one oscillating light fixture has been found to provide substantially identical benefits to that of three fixed installations. Thus, substantially the same results in terms of growth and production of greenhouse plants can be accomplished by means of the present invention utilizing approximately one-third of the individual fixed lamp fixtures of the prior art. Thus, it is possible, by means of the present invention, to eliminate a substantial number of the fixtures necessary in prior art high intensity greenhouse lighting systems, and thus inherently reduce the procurement, operating and maintenance costs of such a greenhouse lighting system. It has also been discovered that the elimination of such a substantial number of large lighting fixtures in such a system has an additional significant benefit, in that natural sunlight, when available, is no longer blocked out as substantially as in prior art systems by the fixtures themselves. By eliminating approximately two-thirds of the individual fixtures, and hence, the resulting shade created by the fixtures, the amount of natural sunlight impinging on the plants is substantially increased.

Thus, an oscillating light apparatus has been described which has significant advantages in environments such as greenhouses, where it may be important that the distributed light energy on a plane surface beneath the lamps be substantially uniform with respect to a given period of time. By determining the prior lamp arc and period for a given application, the light apparatus of the present invention may be utilized to eliminate substantial numbers of light fixtures of prior art fixed systems, while providing in many applications substantially the same results.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. An apparatus for supplying light energy to plants to substantially aid in the growth thereof, comprising:
   high intensity lamp means operable when energized to emit light radiation of a wavelength and in sufficient quantity to stimulate plant growth;
   means pivotally supporting said lamp means a predetermined distance from the plants, which plants are arranged in substantially a horizontal plane below said lamp means;
   means partially surrounding said lamp means for controlling the direction of said light radiation, wherein said radiation controlling means is so configured and arranged that when said lamp means is positioned substantially normal to said horizontal plane on which said plants are arranged and at said predetermined distance therefrom, substantially uniform light radiation is provided over a predetermined area on said horizontal plane; and
   means for cyclically pivoting said lamp means and said controlling means through a predetermined vertically planar arc relative to said horizontal plane, wherein the predetermined arc has a magnitude of less than 90°, a section of said horizontal plane being illuminated as said lamp means pivots through said predetermined arc, the magnitude of said predetermined arc, said predetermined distance, and the configuration of said radiation controlling means being such that light radiation is provided substantially uniformly over a substantial portion of the illuminated section of said horizontal plane during the pivoting of said lamp means through said predetermined arc.

2. An apparatus of claim 1, including means for varying the speed of said lamp means as it is pivoted through said predetermined arc.

3. An apparatus of claim 1, wherein said lamp means is at least 400 watts.

4. An apparatus of claim 1, wherein said predetermined arc has a magnitude of substantially on the order of 60°.

5. An apparatus of claim 1, wherein said pivotally supporting means includes an inverted substantially U-shaped frame and lamp support cradle connected across said U-shaped frame in the vicinity of the ends thereof and pivotally connected thereto.

6. An apparatus of claim 5, wherein said lamp support cradle is generally U-shaped in outline, and comprises three serially rigidly connected sections, the intermediate section supporting said lamp means, the two end sections being pivotally connected at predetermined pivot points therealong to said U-shaped frame such that a line drawn between said pivot points proceeds substantially through the center of gravity of said lamp means when said lamp means is properly positioned in said lamp support cradle.

7. An apparatus of claim 6, wherein said intermediate section includes means for removably securing said lamp means thereto.

8. An apparatus of claim 6, wherein said pivoting means includes a low rpm motor having an output shaft, and further includes first and second elongated members, each elongated member having first and second ends, wherein said first end of said first elongated member is rigidly connected to said output shaft, and wherein said first end of said second elongated member is rotatably connected to one of said end sections of said lamp support cradle, said second ends of said first and second elongated members being rotatably connected together, said motor operative to impart movement to said first and second elongated members and said one end section in substantially parallel planes, thereby pivoting said lamp support cradle about said pivot points.

9. An apparatus of claim 8, wherein at least one of said first and second elongated members includes a plurality of connections in the vicinity of the second end thereof, for rotatable connection thereto by the other elongated member, thereby permitting the speed of said pivoting of said lamp support cradle to be varied.

10. An apparatus for supplying light energy to plants to aid in the growth thereof, comprising:
   a plurality of high intensity lamp means operable when energized to emit light radiation of a wavelength and in sufficient quantities to stimulate plant growth, said plurality of lamp means being substantially coplanar;
   means pivotally supporting said plurality of lamp means a predetermined distance from the plants, which plants are arranged in a horizontal plane below said plurality of lamp means;
   means partially surrounding said lamp means for controlling the direction of said light radiation, wherein said radiation controlling means is so configured and arranged that when said plurality of lamp means are positioned substantially normal to said horizontal plane on which said plants are positioned and at said predetermined distance therefrom, light radiation is provided substantially uniformly over a predetermined area on said horizontal plane for each of said lamp means, a predetermined area being substantially removed from predetermined areas of adjacent lamp means, said plurality of lamp means being pivotally supported at positions relative to one another that radiation from adjacent lamp means sufficiently overlap as the plurality of lamp means are pivoted to provide substantially uniform radiation for plants positioned on said horizontal plane between adjacent lamp means; and means for cyclically pivoting said plurality of lamp means and said controlling means through a predetermined vertically planar arc relative to said horizontal plane, wherein the predetermined arc has a magnitude which, relative to said positions of adjacent lamp means, is such that light radiation is provided substantially uniformly over the plants between adjacent lamp means.

11. An apparatus of claim 10, wherein said lamp means are positioned substantially on the order of 10 feet apart, and wherein said lamp means are positioned substantially on the order of 5 feet above said plants, and wherein said predetermined arc is substantially on the order of 60°.

\* \* \* \* \*